US012427348B2

(12) United States Patent
Petzinger

(10) Patent No.: US 12,427,348 B2
(45) Date of Patent: *Sep. 30, 2025

(54) SYSTEMS AND METHODS FOR SUPPRESSING FIRE IN CONTAINERS

(71) Applicant: Federal Express Corporation, Memphis, TN (US)

(72) Inventor: Mark R. Petzinger, Cordova, TN (US)

(73) Assignee: Federal Express Corporation, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,190

(22) Filed: Jan. 10, 2023

(65) Prior Publication Data

US 2023/0166139 A1 Jun. 1, 2023

Related U.S. Application Data

(60) Continuation of application No. 15/681,816, filed on Aug. 21, 2017, now Pat. No. 11,577,106, which is a
(Continued)

(51) Int. Cl.
*A62C 3/08* (2006.01)
*A62C 3/07* (2006.01)
(Continued)

(52) U.S. Cl.
CPC .................. *A62C 3/08* (2013.01); *A62C 3/07* (2013.01); *A62C 5/02* (2013.01); *A62C 31/22* (2013.01); *A62C 37/08* (2013.01); *A62C 37/36* (2013.01)

(58) Field of Classification Search
CPC .... A62C 3/08; A62C 3/07; A62C 5/02; A62C 31/22; A62C 37/08; A62C 37/36
See application file for complete search history.

(56) References Cited

U.S. PATENT DOCUMENTS 3,588,893 A 6/1971 Closkey
4,875,526 A * 10/1989 Latino .................. A62C 3/0292 239/289
(Continued)

FOREIGN PATENT DOCUMENTS

CN 101291707 A 10/2008
CN 101505838 A 8/2009
(Continued)

OTHER PUBLICATIONS

International Search Report and Written Opinion issued Jul. 24, 2014, in corresponding to PCT International Application No. PCT/US2013/040494.
(Continued)

*Primary Examiner* — Qingzhang Zhou
(74) *Attorney, Agent, or Firm* — Finnegan, Henderson, Farabow, Garrett & Dunner, LLP

(57) ABSTRACT

A device for suppressing fire inside a container includes a support structure configured to be mounted inside a vehicle at a position associated with at least one location configured to receive a container. The device further includes a deployment structure coupled to the support structure and a penetrator assembly coupled to the deployment structure. The penetrator assembly includes a nozzle having a tip configured to pierce a container and an actuator associated with the nozzle. The actuator is configured to extend the tip of the nozzle such that it pierces a container. The support structure and the deployment structure are configured such that the penetrator assembly is movable in at least one plane with respect to the support structure, and the penetrator assembly is configured to receive fire suppressant and direct the fire suppressant into the container.

23 Claims, 13 Drawing Sheets

Related U.S. Application Data division of application No. 13/891,728, filed on May 10, 2013, now Pat. No. 9,770,612.

(60) Provisional application No. 61/646,970, filed on May 15, 2012.

(51) Int. Cl.

| | |
|---|---|
| ***A62C 5/02*** | (2006.01) |
| ***A62C 31/22*** | (2006.01) |
| ***A62C 37/08*** | (2006.01) |
| *A62C 37/36* | (2006.01) |

(56) References Cited

U.S. PATENT DOCUMENTS

| | | | | |
|---|---|---|---|---|
| 7,055,613 | B1 * | 6/2006 | Bissen | A62C 31/22 169/68 |
| 7,533,734 | B2 | 5/2009 | Fore et al. | |
| 7,810,577 | B2 * | 10/2010 | Popp | G01J 5/025 169/68 |
| 9,308,404 | B2 | 4/2016 | Popp | |
| 2006/0022001 | A1 | 2/2006 | Linsmeier et al. | |
| 2006/0065411 | A1 * | 3/2006 | Linsmeier | A62C 27/00 169/24 |
| 2006/0219416 | A1 | 10/2006 | Fore et al. | |
| 2007/0034389 | A1 | 2/2007 | Relyea et al. | |
| 2007/0044979 | A1 * | 3/2007 | Popp | G01J 5/0014 169/56 |
| 2007/0205005 | A1 * | 9/2007 | Peltola | A62C 31/22 239/271 |

FOREIGN PATENT DOCUMENTS

| | | | |
|---|---|---|---|
| CN | 101653645 | A | 2/2010 |
| DE | 3917205 | C1 | 8/1990 |
| WO | 2007/111897 | A1 | 10/2007 |

OTHER PUBLICATIONS

First Office Action issued by State Intellectual Property Office, P.R. China, in corresponding Chinese Patent Application 201380037754.8, mailed Jun. 17, 2016.

Second Office Action issued by State Intellectual Property Office, P.R. China, in corresponding Chinese Patent Application 201380037754.8, mailed Jan. 16, 2017.

* cited by examiner

SYSTEMS AND METHODS FOR SUPPRESSING FIRE IN CONTAINERS

RELATED APPLICATIONS

This is a continuation of application Ser. No. 15/681,816, filed Aug. 21, 2017, which application is a division of application Ser. No. 13/891,728, filed May 10, 2013, which application claims the benefit of U.S. provisional application No. 61/646,970, filed May 15, 2012, all of which are incorporated herein by reference.

FIELD OF THE DISCLOSURE

The present disclosure relates to systems and methods for suppressing fires. In particular, the present disclosure relates to systems and methods for suppressing fires associated with containers.

BACKGROUND OF THE DISCLOSURE

Cargo may be transported to its destination using one or more of several different types of vehicles, including, for example, ships, trains, aircraft, and trucks. Such cargo is transported while located in the interior of cargo areas. In some cases, cargo may include hazardous, easily flammable, and/or easily combustible materials that may render transport dangerous to the cargo itself, as well as to the vehicle transporting the cargo and operators of the vehicle.

In many instances, cargo may be carried in an area separated from an operator controlling the vehicle. As a result, an operator may be unaware of a fire or explosion that has occurred within a cargo container or within the cargo area. In addition, there is often more than one cargo container located in any given cargo area. This may render it difficult to determine which containers are on fire, even if it has been determined that there is a fire occurring within a given cargo area.

Due to the nature of a cargo vehicle, there may be a limited supply of fire suppressant available. For example, aboard a cargo aircraft, the weight of any fire suppressant may limit the amount of fire suppressant that may be carried for suppressing fires. Therefore, it may be desirable to limit the amount of fire suppressant used to extinguish a fire in order to reduce the weight carried by the aircraft by focusing any release of fire suppressant on the particular area in need of fire suppressant, rather than merely releasing a large enough amount of suppressant to flood the entire cargo area. Furthermore, the fire suppressant itself may be harmful to some types of cargo. Therefore, it may be desirable to limit the release of fire suppressant to the location in need of fire suppression, so as to limit the spoilage of cargo not in need of fire suppressant. As a result, it may be desirable to provide a fire detection system that can determine the approximate location of a fire, so that an appropriate amount of fire suppressant can be directed solely to the location experiencing the fire.

Because cargo areas experiencing a fire may be located remotely from cargo vehicle operators (i.e., the cargo may be located in an unoccupied and/or difficult to access portion of the vehicle), it may be more difficult to provide fire suppressant to an area experiencing a fire in a timely manner. Therefore, it may be desirable to provide a system for supplying fire suppressant remotely and in a timely manner.

One example of a cargo vehicle having an operator located relatively remotely from the cargo area is an aircraft. The majority of cargo carried by modern aircraft is transported in cargo containers or on cargo pallets. The containers are generally referred to generically as Unit Load Devices ("ULDs"). For safety considerations, ULDs must often be configured to engage an aircraft cargo locking system in order to restrain the cargo containers under various flight, ground load, and/or emergency conditions. Under federal air regulations, ULDs are considered aircraft appliances, are Federal Aviation Administration (FAA)-certified for a specific type of aircraft, and are typically manufactured to specifications contained in National Aerospace Standard (NAS) 3610.

In the cargo aircraft example, while some cargo areas may be conventionally equipped with fire extinguishing bottles intended for manual operation, very few cargo containers may be accessible to flight crews during a flight, thereby rendering it difficult to manually extinguish a fire located in an aircraft cargo area using fire extinguishing bottles. In addition, fires may occur inside cargo containers, and if those fires are not suppressed or extinguished, they could breach the walls of the container and spread throughout the cargo area. However, it may be difficult, if not impossible, to suppress or extinguish a fire inside a container without discharging fire suppressant into the interior of the container.

Thus, it may be desirable to provide a system for detecting a fire in a cargo container of a vehicle cargo area. Further, it may be desirable to provide a system for suppressing a fire associated with a container for which a fire has been detected. In addition, it may be desirable to provide a system for supplying fire suppressant inside the container. Further, it may be desirable to provide a system that has reduced weight for suppressing a fire associated with a container.

In order reduce the labor and time associated with loading and unloading cargo from a cargo area, it is desirable to minimize impediments to crews responsible for loading and unloading cargo. Thus, it may be desirable to provide a system for suppressing a fire that does not provide unnecessary impediments to loading and unloading cargo from a cargo area.

Problems associated with detecting and/or suppressing fires are not limited to the cargo transportation industry. Similar problems may arise, for example, wherever cargo and/or other articles are stored in a location that is remote from a person supervising the cargo or other articles, such as, for example, a storage facility. Thus, in a broad variety of situations, it may be desirable to remotely detect and/or remotely suppress a fire.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a device for suppressing fire inside a container. The device may include a support structure configured to be mounted inside a vehicle at a position associated with at least one location configured to receive a container. The device may further include a deployment structure coupled to the support structure and a penetrator assembly coupled to the deployment structure. The penetrator assembly may include a nozzle having a tip configured to pierce a container and an actuator associated with the nozzle. The actuator may be configured to extend the tip of the nozzle such that it pierces a container. The support structure and the deployment structure may be configured such that the penetrator assembly is movable in at least one plane with respect to the support structure, and the penetrator assembly may be configured to receive fire suppressant and direct the fire suppressant into the container.

As used herein, the term "fire" is not necessarily limited to a fire having visible flames. Rather, the term "fire" is used in a broad sense and may be used to describe situations in which an object and/or surface is exhibiting a higher temperature than desired or considered to be unsafe to a person having skill in the art, such as, for example, a situation in which an object and/or surface is smoldering, smoking, and/or is hot to the touch.

According to another aspect, a system for suppressing fire inside a container may include a support structure configured to be mounted inside a vehicle at a position associated with at least one location configured to receive a container. The system may also include a deployment structure coupled to the support structure and a penetrator assembly coupled to the deployment structure. The penetrator assembly may include a nozzle having a tip configured to pierce a container and an actuator associated with the nozzle. The actuator may be configured to extend the tip of the nozzle such that it pierces the container. The system may also include a fire suppressant delivery system associated with the penetrator assembly. The support structure and the deployment structure may be configured such that the penetrator assembly is movable in at least one plane with respect to the support structure, and the fire suppressant delivery system may be configured to supply fire suppressant to the nozzle.

According to a further aspect, a vehicle for transporting containers may include a body defining an interior of the vehicle, a deck within the body, the deck configured to support a plurality of containers, and a ceiling spaced above the deck. The vehicle may further include a system for suppressing fire inside a container supported by the deck. The system may include a support structure mounted inside the body at a position associated with at least one location configured to receive a container, and a deployment structure coupled to the support structure. The system may further include a penetrator assembly coupled to the deployment structure. The penetrator assembly may include a nozzle having a tip configured to pierce a container, and an actuator associated with the nozzle. The actuator may be configured to extend the tip of the nozzle such that it pierces the container. The system may also include a fire suppressant delivery system associated with the penetrator assembly. The support structure and the deployment structure may be configured such that the penetrator assembly is movable in at least one plane with respect to the support structure. The fire suppressant delivery system may be configured to supply fire suppressant to the nozzle and inside the container.

It is to be understood that both the foregoing general description and the following detailed description are exemplary and explanatory only and are not restrictive of the invention, as claimed.

The accompanying drawings, which are incorporated in and constitute a part of this specification, illustrate several exemplary embodiments of the invention and together with the description, may serve to explain the principles of the invention.

DESCRIPTION OF EXEMPLARY EMBODIMENTS

Reference will now be made in detail to exemplary embodiments of the invention, which are illustrated in the accompanying drawings. Wherever possible, the same reference numbers will be used throughout the drawings to refer to the same or like parts.

Figure 1:
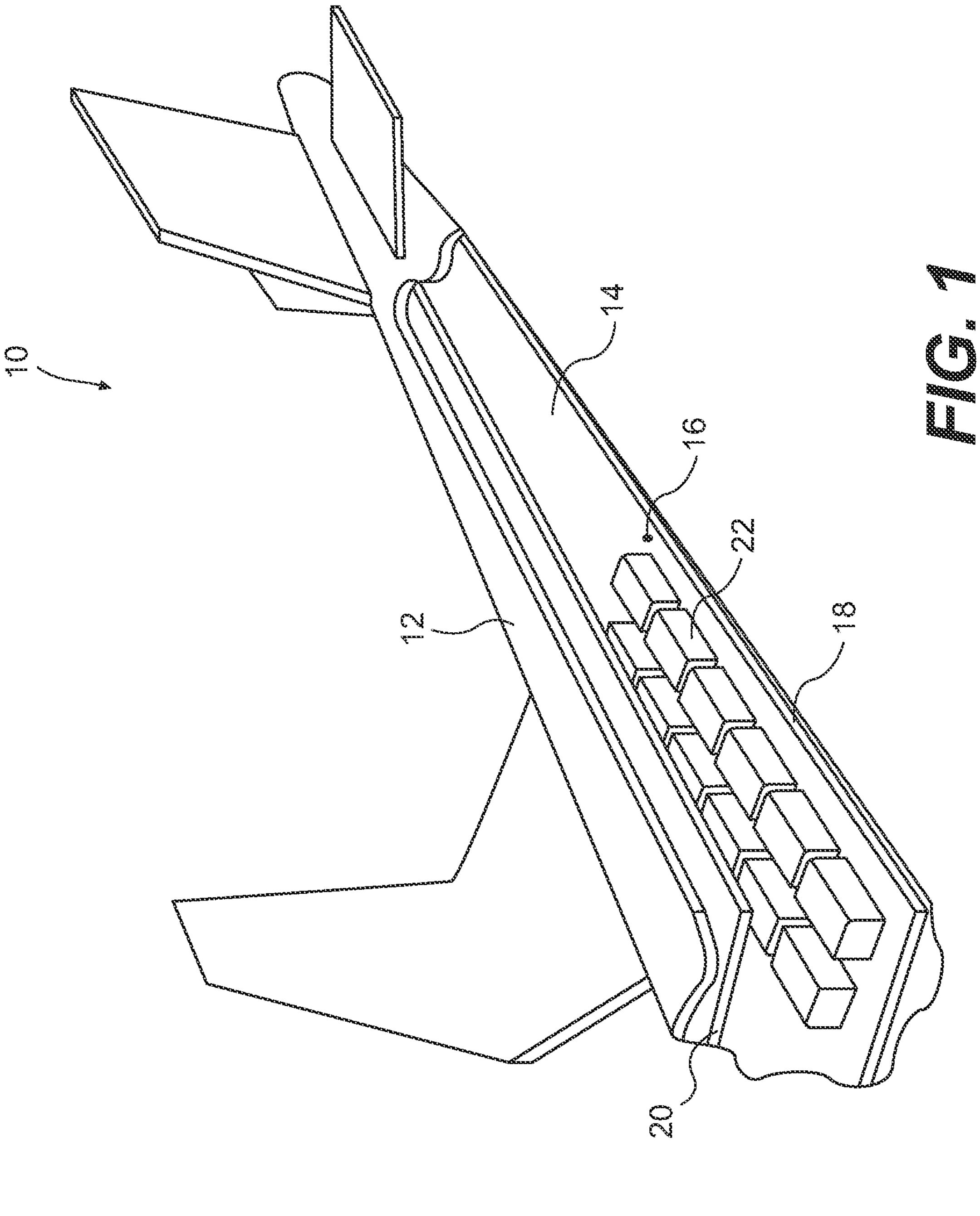
FIG. 1 is a schematic, perspective cut-away view of an exemplary vehicle.
Figure 2:
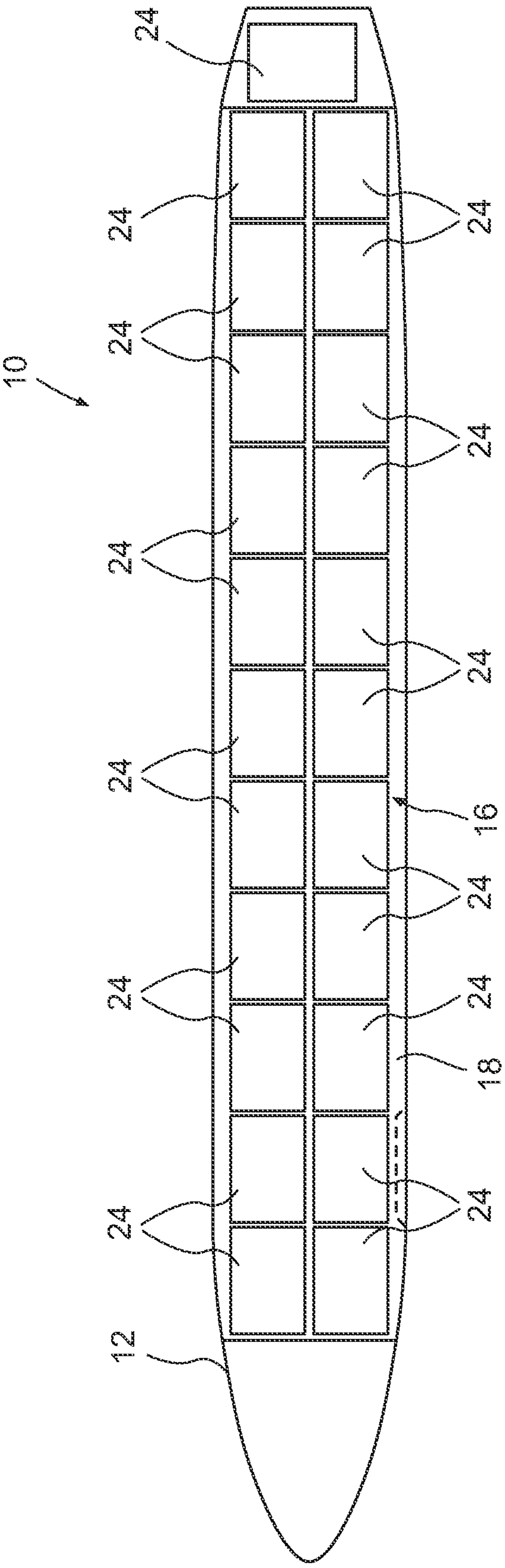
FIG. 2 is a schematic plan view of an exemplary cargo area.

FIGS. 1 and 2 depict an exemplary cargo aircraft 10, which is merely one example of an environment in which the exemplary systems for suppressing a fire inside a container disclosed herein may be used. Use in other environments is also possible and contemplated, such as, for example, in ships, trucks, trains, other types of vehicles, and/or storage facilities.

As shown in FIG. 1, exemplary aircraft 10 includes a body 12 (i.e., a fuselage) defining an interior 14 of aircraft 10. Interior 14 may includes a cargo area 16 having a deck 18 and a ceiling 20 spaced above deck 18. Deck 18 may be configured to support one or more cargo containers 22 configured to contain items for transport aboard aircraft 10. For example, deck 18 may include rollers and/or fixtures (not shown) configured to facilitate ease of movement of containers 22 within cargo area 16 and/or to secure containers 22 in a fixed position on deck 18.

Referring to FIG. 2, exemplary deck 18 of aircraft 10 is divided into a number of cargo positions 24 to guide placement of containers 22. For example, the exemplary deck 18 shown in FIG. 2 is divided into two longitudinally-extending rows defining cargo positions 24 for placement of containers 22. The number and configuration of cargo positions 24 is exemplary and other numbers and configurations are contemplated.

Figure 3:
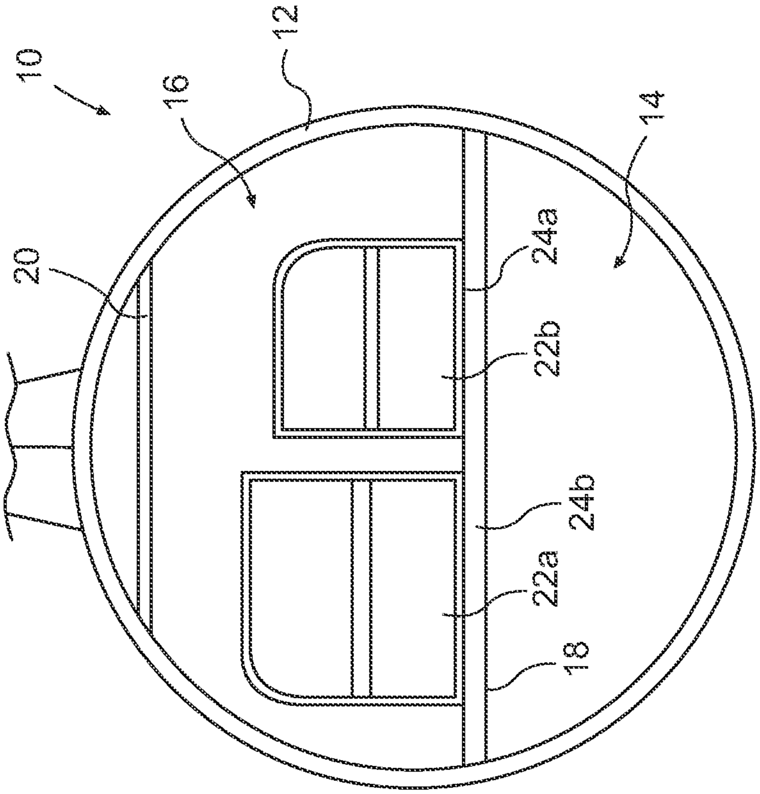
FIG. 3 is a schematic section view an exemplary cargo area.

Referring to FIG. 3, containers 22*a* and 22*b* located at cargo positions 24*a* and 24*b*, respectively, may be cargo containers, such as, for example, ULDs. Such containers may have differing dimensions. For example, a very commonly used industry ULD is the "SAA" designated container, which measures about 88 inches wide by about 125 inches long, with an arched roof about 82 inches high. Another example of a ULD is the "AMJ" designated container, which measures about 96 inches wide by about 125 inches long, with a maximum height of about 96 inches. ULDs may have walls formed of, for example, one or more of aluminum, steel, composites, fiberglass, and LEXAN. Containers 22 may be any containers known to those skilled in the cargo container art. For example, containers 22 may be any containers certified by the FAA and/or may be manufactured to specifications contained in NAS 3610.

Figure 4:
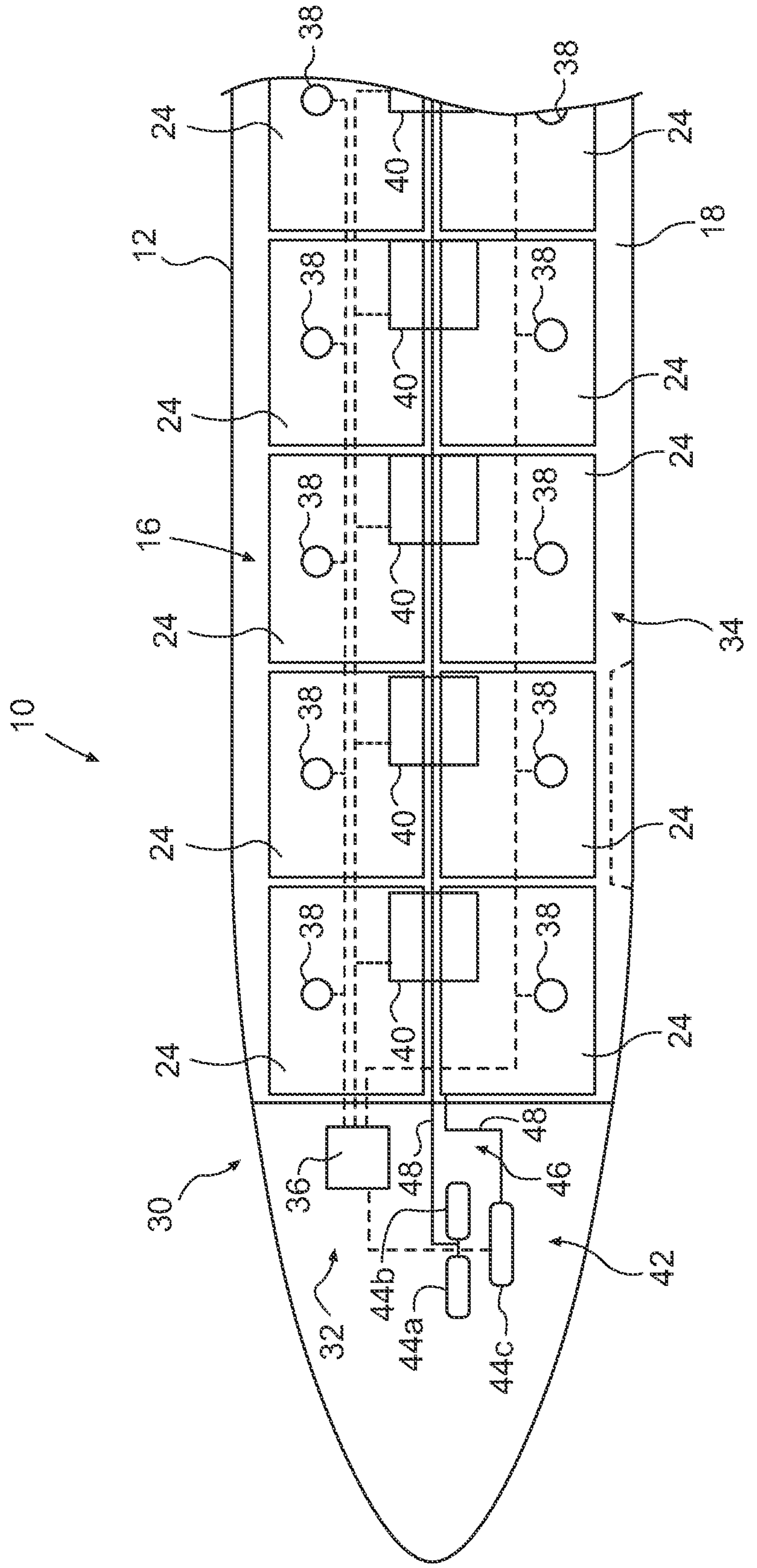
FIG. 4 is a schematic plan view of an exemplary embodiment of a system for suppressing fire shown in conjunction with an exemplary vehicle.

As shown in FIG. 4, exemplary aircraft 10 may be provided with a system 30 for suppressing a fire associated with (e.g., within) one or more of containers 22. For example, exemplary system 30 shown in FIG. 4 includes a control system 32 and a fire suppression system 34. Control system 32 may be configured to receive signals from one or more sensors 38 for detecting a temperature associated with one or more of containers 22, and determine whether the detected temperature is greater than a predetermined temperature, and if so, either activate fire suppression system 34 or activate a warning signal. In some embodiments, control system 32 activates both a fire suppression system 34 and a warning signal. Such signals may be transmitted via hardwire, wireless systems, and/or infrared systems known to those skilled in the art. For example, infra-red transmission systems may be used in order to reduce interference with, for example, signals associated with operation of aircraft 10.

Control system 32 may include a switch (not shown), such that an operator of the aircraft 10 may manually activate fire suppression system 34. Fire suppression system 34 is configured such that when activated, fire suppressant is supplied to the container 22 (e.g., into the interior of the container 22) associated with the sensor 38 that detects a temperature greater than the predetermined temperature. As explained in more detail below, exemplary system 30 for suppressing a fire may be capable of detecting a fire inside a container, deploying a penetrator system to the container, piercing the container, and/or supplying fire suppressant into the interior of the container.

As shown in FIG. 4, exemplary control system 32 includes at least one control module 36 configured to control exemplary system 30 and one or more sensors 38 in communication with control module 36 for detecting a temperature associated with one or more of containers 22. Exemplary control module 36 may be a microprocessor-based controller, such as, for example, a programmable or pre-programmed controller that operates digitally according to logic and/or program instructions stored either within controller 30 or downloaded remotely via physical connection and/or wireless communication link.

In exemplary control system 32, one or more sensors 38 may be mounted in cargo area 16 in relation to one or more of respective cargo positions 24, such that the sensors 38 are able to detect a temperature associated with a container 22 located at, or in the vicinity of, the respective cargo positions 24. For example, one or more sensors 38 may be mounted above (e.g., via ceiling 20) and/or to the side of (e.g., adjacent to) a cargo position 24, such that the one or more sensors 38 can detect a temperature associated with a container 22 positioned at the corresponding cargo position 24. Sensors 38 may be, for example, thermopiles, optical pyrometers, and/or infrared sensors. Any temperature sensors known to those skilled in the art are contemplated and may be used. According to some embodiments, signals may be sent to a warning system, including, for example, warning lights and/or audible messages for warning an operator or system supervisor. Some embodiments may include a manual switch that may be triggered by an operator to activate the exemplary system 30 upon receipt of warning signals.

Exemplary fire suppression system 30 shown in FIG. 4 includes a fire suppression system 34, including one or more fire suppressant devices 40 configured to suppress a fire associated with (e.g., inside) one or more of containers 22 and a fire suppressant delivery system 42 configured to supply fire suppressant to fire suppressant devices 40. For example, fire suppressant delivery system 42 may include one or more tanks 44 containing fire suppressant and a manifold system 46, including conduit 48 and associated fittings (not shown) for providing flow communication between the tank(s) 44 and one or more devices 40 for suppressing a fire. Conduit 48 and related fittings may be any suitable conduit and/or fittings known to those skilled in the art. Manifold system 46 may be configured to selectively supply fire suppressant to one or more of individual fire suppressant devices 40. In particular, manifold system 46 may include a number of valves (not shown) configured to direct flow to any one or more of fire suppressant devices 40 in response to signals received from control module 36. As a result, if a fire associated with one of containers 22 is detected, control module 36 is configured to send a signal to appropriate valves of manifold system 46, such that fire suppressant is supplied only to the container 22 associated with the detected fire.

For example, as shown in FIG. 4, exemplary system 30 includes three tanks 44*a*, 44*b*, and 44*c*. Tanks 44*a*, 44*b*, and 44*c* may each contain the same fire suppressant, different fire suppressants, or different components that are combined to form a single fire suppressant. For example, tank 44*a* and 44*b* may contain gas, and tank 44*c* may contain foam solution, such that when the gas and foam solution is combined at a fire suppressant device 40, fire suppressant foam is created for discharging into the container 22, as explained in more detail herein. For example, the gas may include oxygen, nitrogen, or any inert gas (i.e., helium, neon, argon, krypton, xenon, and radon). The foam solution may be, for example, CARGO FOAM marketed by ANSUL, or any other solution that becomes foam when combined with gas. Other fire suppressant agents and/or components known to those skilled in the art are contemplated and may be used.

Figure 5:
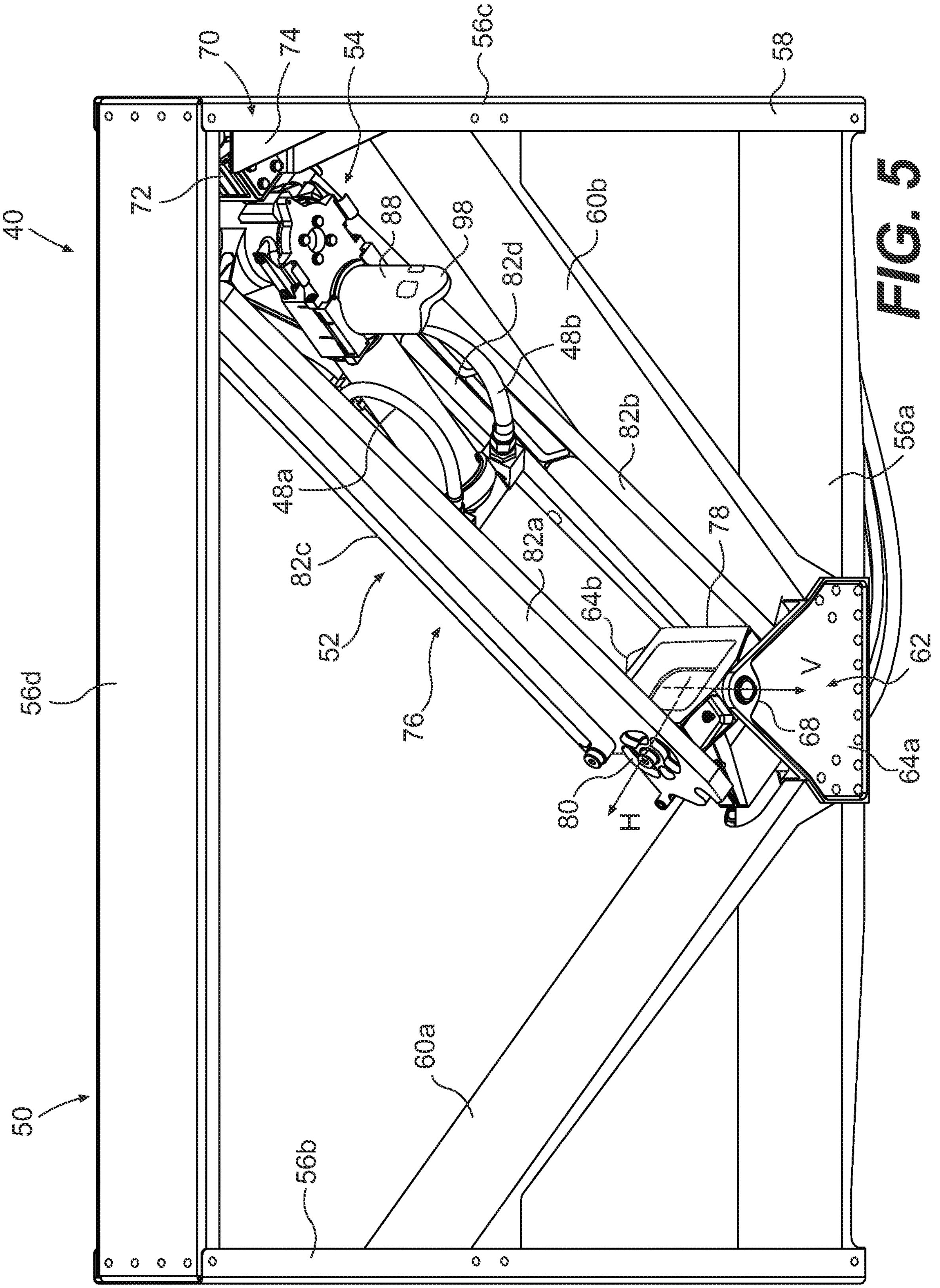
FIG. 5 is a schematic perspective view of an exemplary embodiment of a device for suppressing fire in an exemplary stowed condition.

Referring to FIG. 5, exemplary fire suppressant device 40 includes a support structure 50 configured to be mounted inside, for example, aircraft 10, a deployment structure 52, and a penetrator assembly 54. As shown in FIG. 5, exemplary support structure 50 is configured to provide mounting points for various components of fire suppressant device 40, as explained in more detail below.

Figure 8A:
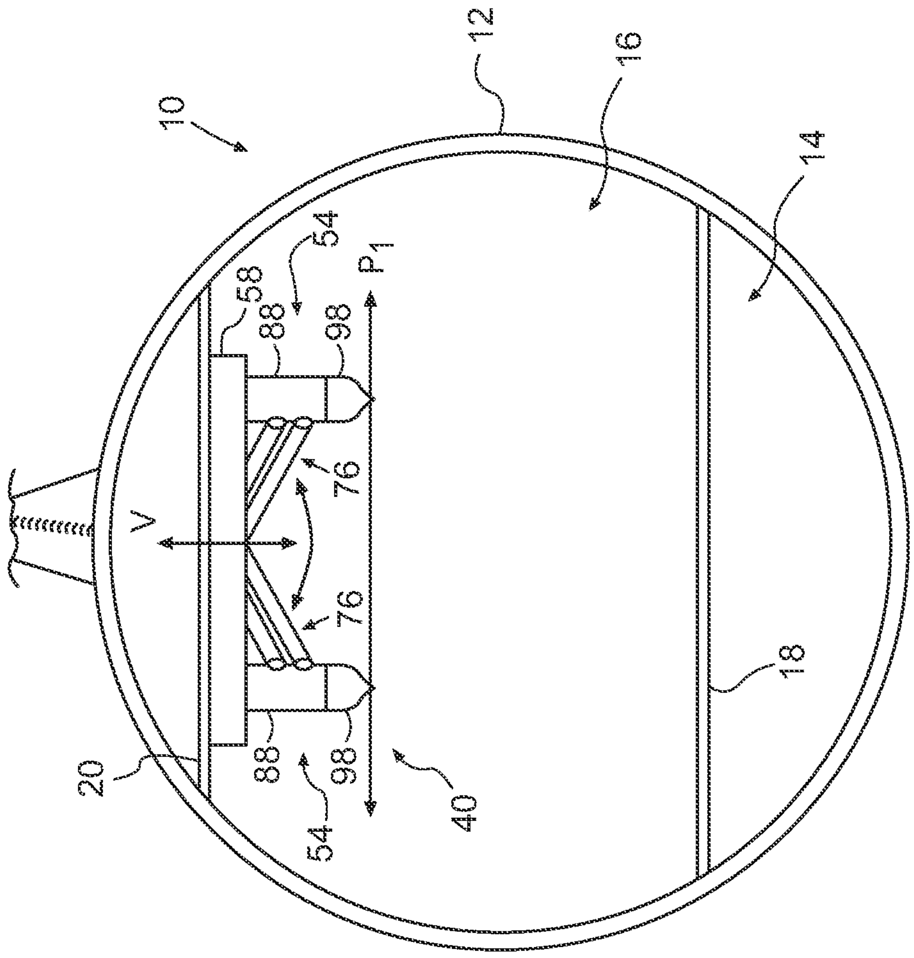
FIG. 8A is a schematic section view of an exemplary embodiment of a device for suppressing fire showing exemplary movement in a first plane $P_1$.
Figure 8B:
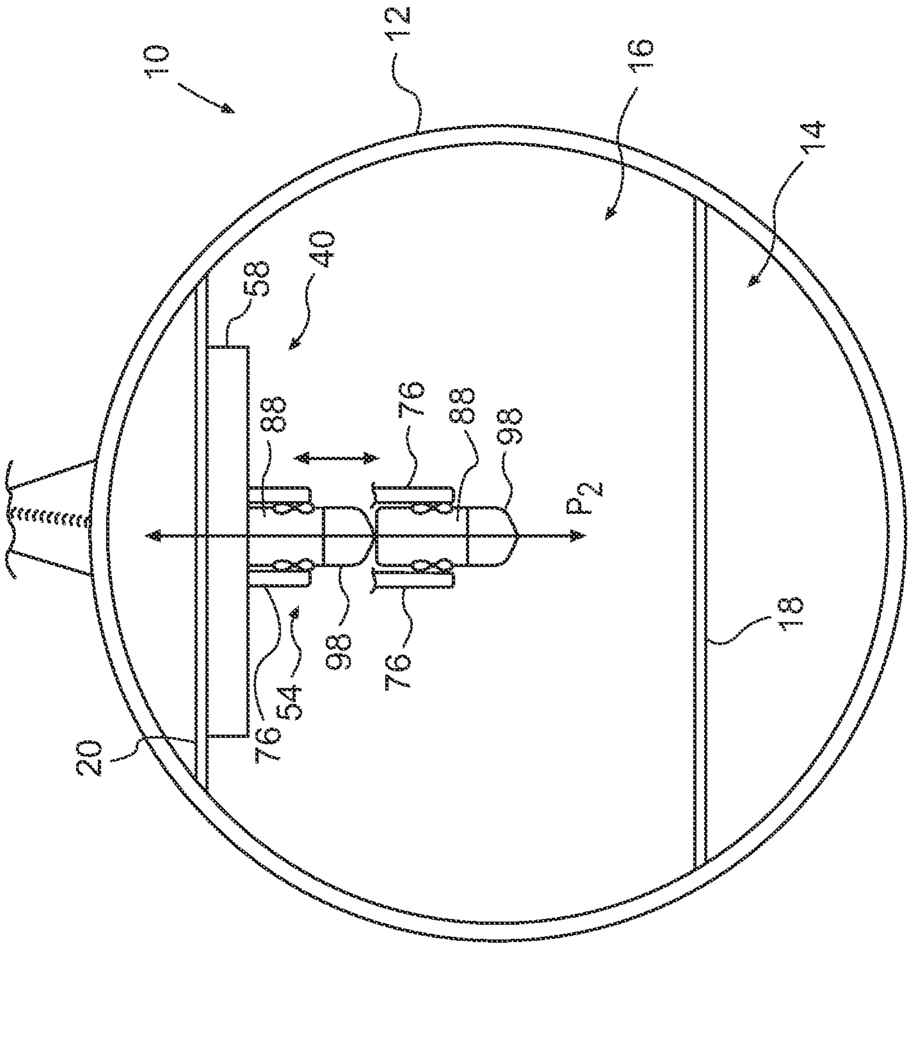
FIG. 8B is a schematic section view of an exemplary embodiment of a device for suppressing fire showing exemplary movement in a second plane $P_2$.

Exemplary support structure 50 shown in FIG. 5 includes four frame members 56*a*-56*d* coupled to one another to form a generally rectangular frame 58 (e.g., a generally square frame). Exemplary frame 58 is configured to be attached to the interior of a vehicle, for example, cargo area 16 of aircraft 10, via known attachment devices (e.g., bolts, screws, welded joints, etc.). For example, as shown in FIGS. 8A and 8B, exemplary frame 58 is attached to ceiling 20 of aircraft 10, so that frame 58 is oriented in a substantially horizontal plane and is positioned along a center line of aircraft 10. Other locations and/or orientations are contemplated.

As used herein, the terms "horizontal" and "vertical," and derivatives thereof, may be used to describe positions and orientations in a relative sense, such as, for example, in a sense relative to a structure to which frame 58 may be mounted. Thus, to the extent that, for example, a vehicle in which frame 58 is mounted is level, frame 58 is mounted such that it lies in a horizontal plane. However, if the vehicle in which frame 58 is mounted is not level, frame 58 would be not be horizontal in a global sense, but rather in a relative sense, such that frame 58 would lie in a plane substantially parallel to, for example, a plane in which deck 18 and/or ceiling 20 of aircraft 10 lies, at least in the exemplary embodiments disclosed herein. However, the terms "horizontal" and "vertical," with respect to each other, are generally orthogonal to one another, regardless of whether those terms are used in a global or relative sense.

Figure 6:
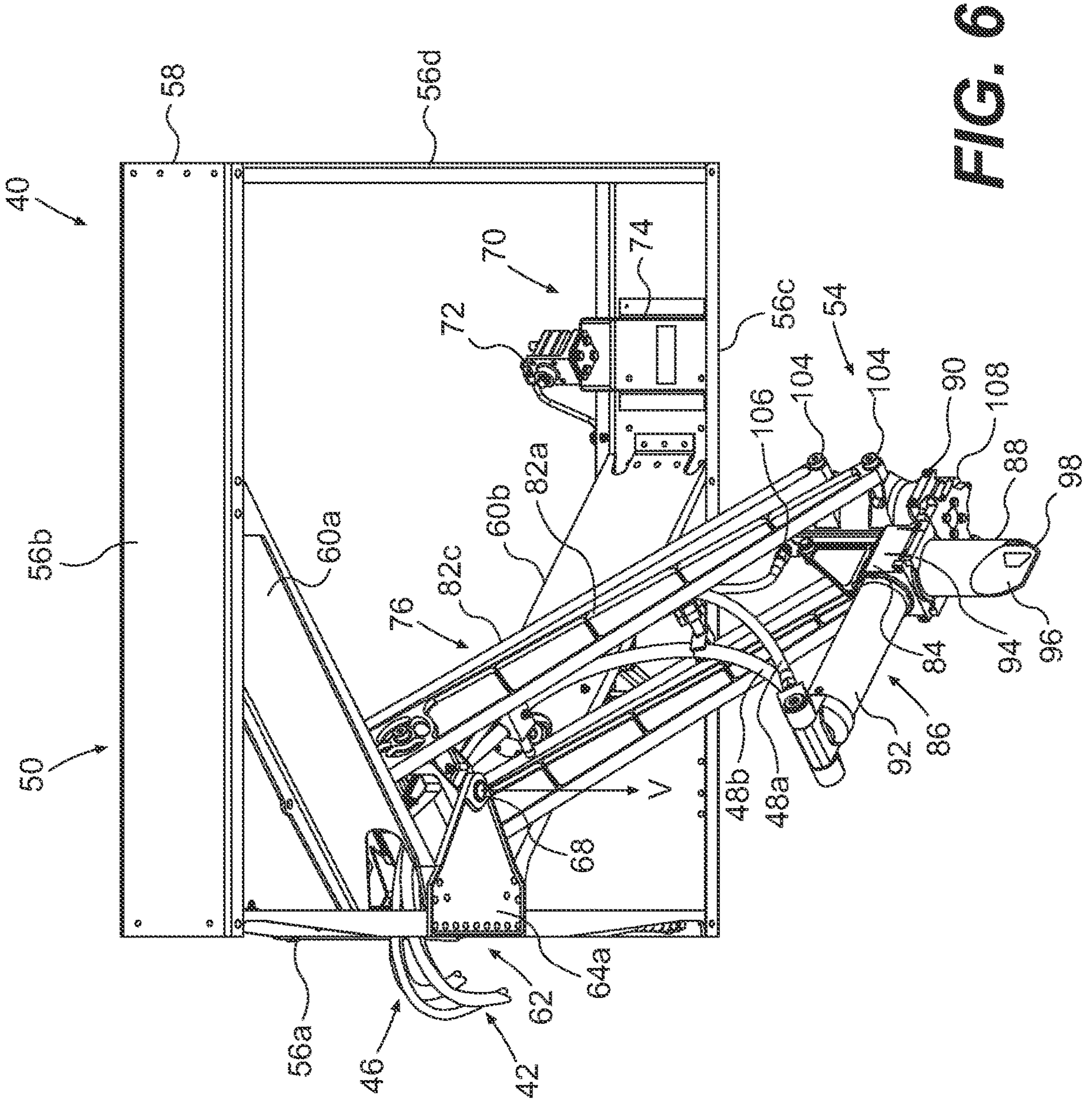
FIG. 6 is a schematic perspective view of the exemplary device shown in FIG. 5 in an exemplary deployed condition.

As shown in FIGS. 5 and 6, exemplary frame 58 further includes two brace members 60*a* and 60*b*, which both extend from a generally central point of frame member 56*a* to a generally central point of frame members 56*b* and 56*c*, respectively. Brace members 60*a* and 60*b* provide support for frame 58 and deployment structure 52. Exemplary support structure 50 may be formed of one or more of aluminum, titanium, steel, composite material, such as, for example, carbon fiber, and/or any other suitable materials known to those skilled in the art. In addition, exemplary frame members 56*a*-56*d* and brace members 60*a* and 60*b* may have any cross-sectional shape, such as, for example, C-shaped, channel-shaped, I-shaped, L-shaped, Z-shaped, circular, and/or box-shaped. Other cross-sectional shapes known to those skilled in the art are contemplated and may be used.

Exemplary support structure 50 further includes a pivot mount 62 configured to provide an attachment point for deployment structure 52. As shown in FIGS. 5 and 6, exemplary pivot mount 62 includes a first plate 64*a* coupled to an underside of brace members 60*a* and 60*b* and frame member 56*a*, and a second plate 64*b* (see FIGS. 9A and 9B) coupled to an upper side of brace members 60*a* and 60*b* and frame member 56*a*, at a point where brace members 60*a* and 60*b* meet at the generally central point of frame member 56*a*. Exemplary plates 64*a* and 64*b* provide a pivot point defining a vertical axis V for receiving deployment structure 52 and providing a vertical hinge 68, which enables deployment structure 52 to swing in a pivoting manner in a first plane $P_1$ (e.g., a horizontal plane) (see, e.g., FIG. 8A).

Exemplary support structure 50 also includes a stow mount 70 configured to support a latch assembly, which maintains deployment structure 52 in a stowed condition when exemplary fire suppressant device 40 is not in use. By virtue of maintaining this stowed condition, fire suppressant device 40 does not interfere with, for example, the loading and unloading of containers 22 into and from cargo area 16. Exemplary stow mount 70 includes a support bracket 74 mounted to frame 58.

Exemplary deployment structure 52 shown in FIGS. 5 and 6 includes an arm 76 coupled at one end to support structure 50 and at the opposite end to penetrator assembly 54. More specifically, exemplary deployment structure 52 includes a pivot member 78 coupled to hinge 68, and exemplary pivot member 78 includes a hinge 80 to which one end of arm 76 is coupled. Hinge 80 provides a pivot point defining a horizontal axis H (FIG. 5), which enables arm 76 to swing in a pivoting manner in a second plane $P_2$ (e.g., a vertical plane), which is generally orthogonal with respect to the first plane $P_1$. (See, e.g., FIG. 8B). Thus, by virtue of exemplary arm 76 of deployment structure 52 being coupled to support structure 50 via hinges 68 and 80, arm 76 may be pivoted in two generally orthogonal planes (e.g., a horizontal plane and a vertical plane, respectively).

As shown in FIGS. 5 and 6, exemplary arm 76 includes two lower links 82*a* and 82*b* and two upper links 82*c* and 82*d*. More specifically, links 82*a*-82*d* are coupled at one end to pivot member 78, such that lower links 82*a* and 82*b* are coupled to a lower portion of pivot member 78, and upper links 82*c* and 82*d* are coupled to an upper portion of pivot member 78. Links 82*a*-82*d* are also coupled at the opposite end to penetrator assembly 54, such that lower links 82*a* and 82*b* are coupled to a lower portion of penetrator assembly 54, and upper links 82*c* and 82*d* are coupled to an upper portion of penetrator assembly 54. Lower and upper links 82*a*-82*d* are coupled to pivot member 78 and penetrator assembly 54 in a manner that permits each of links 82*a*-82*d* to pivot relative to pivot member 78 and penetrator assembly 54.

In the exemplary embodiment shown, lower links 82*a* and 82*b* are generally parallel to upper links 82*c* and 82*d*. By virtue of this exemplary arrangement, as arm 76 pivots in second plane $P_2$ (e.g., a vertical plane), penetrator assembly 54 maintains a substantially constant orientation relative to support structure 50. In particular, frame 58 of support structure 50 is shown lying in an exemplary horizontal plane, and as arm 76 pivots in a plane orthogonal to the horizontal plane, penetrator assembly 54, although moving vertically in relation to frame 58, does not rotate relative the horizontal plane, thus maintaining its orientation relative to frame 58.

Figure 7A:
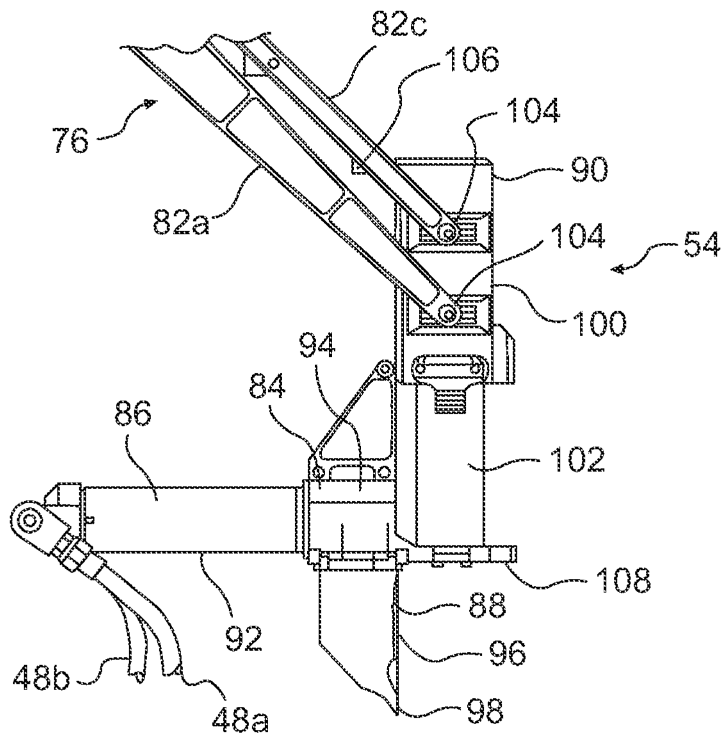
FIG. 7A is a schematic, partial elevation view of a portion of the exemplary device shown in FIGS. 5 and 6.

Exemplary penetrator assembly 54 is configured to receive fire suppressant from fire suppressant delivery system 42, pierce a barrier, such as, for example, a wall of a container 22 (e.g., an upper wall of container 22), and direct fire suppressant into the interior of container 22. Referring to FIG. 7A, exemplary penetrator assembly 54 includes a housing 84, a fire suppressant receiving chamber 86, a nozzle 88, and a puncture actuator 90. Fire suppressant receiving chamber 86, nozzle 88, and a puncture actuator 90 are coupled to one another via housing 84.

Exemplary fire suppressant receiving chamber 86 includes a tubular structure 92, which is in flow communication with fire suppressant delivery system 42 via conduits 48*a* and 48*b*. In the exemplary embodiment shown, conduits 48*a* and 48*b* are coupled to one end of tubular structure 92 and provide flow communication via manifold system 46 to tanks 44*a*-44*c* (see FIGS. 5, 6, and 7A).

During activation of exemplary system 30, control system 32 operates to open appropriate valves in manifold system 46, so that conduits 48*a* and 48*b* supply fire suppressant to receiving chamber 86. Tanks 44*a*-44*c* may supply the same fire suppressant to receiving chamber 86. However, according to some embodiments, tanks 44*a* and 44*b* and tank 44*c* may contain different components of a fire suppressant, and conduits 48*a* and 48*b* may supply first and second fire suppressant components, respectively, to receiving chamber 86. For example, tanks 44*a* and 44*b* may supply gas to receiving chamber 86, and tank 44*c* may supply foam solution to receiving chamber 86. Receiving chamber 86 may include a foam generator (not shown) in tubular structure 92, with the foam generator being configured to receive gas and foam solution, and combine the gas and foam solution to form fire suppressant foam.

Exemplary receiving chamber 86 is in flow communication with housing 84, which includes a chamber 94 defined therein. Exemplary nozzle 88 includes a tubular member 96, which is coupled to housing 84, thereby providing flow communication between tubular member 96 and receiving chamber 86 via chamber 94 of housing 84. Thus, fire suppressant supplied to receiving chamber 86 via fire suppressant delivery system 42 flows through chamber 94 and into tubular member 96 of nozzle 88.

Tubular member 96 of exemplary nozzle 88 extends from housing 84 and ends in a tip 98 configured to pierce a barrier, such as a wall of container 22. Tip 98 may be configured with a scalloped edge or other characteristic for facilitating the piercing of a barrier. Tubular member 96, although shown as having a circular cross-section, may have any one of a number of cross-sections, such as, for example, square-shaped, triangular-shaped, etc. The tubular configuration of exemplary tubular member 96 provides flow communication between chamber 94 of housing 84 and the tip-end of nozzle 88, so that fire suppressant may flow from housing 94 and out tip 98 and behind a barrier pierced by tip 98 (e.g., a wall of container 22). Exemplary tip 98 may be formed from one or more of steel, cutting steel, stainless steel, titanium, ceramics, composites, or any other material(s) known to those skilled in the art for piercing materials, such as, for example, aluminum, steel, composites, carbon fiber, LEXAN, fiberglass, and/or any other material of which a barrier (e.g., a wall of container 22) may be formed. According to some embodiments, tip 98 may be frangible, so that once it has penetrated a barrier, it may be disassociated from a portion of the remainder of nozzle 88 and/or housing 84.

Figure 7B:
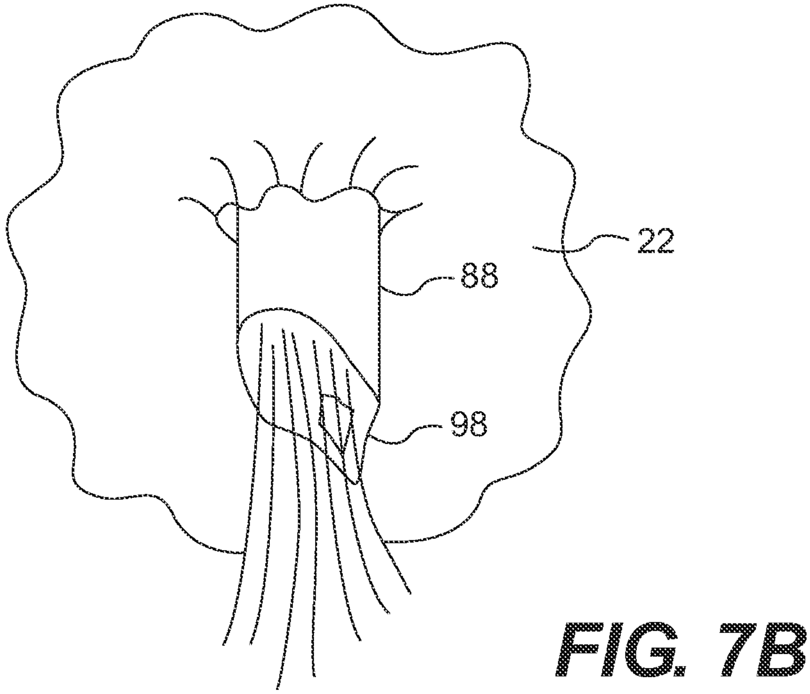
FIG. 7B is a schematic, partial perspective view of an exemplary embodiment of a nozzle piercing a barrier and discharging fire suppressant.

As shown in FIG. 7A, exemplary puncture actuator 90 includes a cylinder portion 100 and a piston portion 102. FIG. 7 shows exemplary puncture actuator 90 in an extended configuration, with piston portion 102 extending from cylinder portion 100. Cylinder portion 100 includes bosses 104, which facilitate the coupling of links 82*a*-82*d* to penetrator assembly 54, such that links 82*a*-82*d* are permitted to pivot with respect to bosses 104. In addition, cylinder portion 100 may include a catch (not shown) for cooperating with a stow actuator, as explained in more detail below. For embodiments of puncture actuator 90 that are pneumatic or hydraulic actuators, cylinder portion 100 includes a fitting 106 for receipt of pressurized air or hydraulic fluid, respectively, such that upon supply of pressurized fluid to cylinder portion 100, piston portion 102 extends from cylinder portion 100. In the exemplary embodiment shown, one end of piston portion 102 is coupled to a flange 108 of housing 84. Thus, upon extension of piston portion 102 from cylinder portion 100, housing 84, receiving chamber 86, and nozzle 88 are extended from penetrator assembly 54. As a result, tip 98 of nozzle 88 is extended, thus piercing a barrier adjacent to, or against which, tip 98 may be positioned prior to extension. Thus, if tip 98 is adjacent a barrier (e.g., the wall of a container 22), piston portion 102 drives tip 98 into and through the barrier, thereby providing flow communication between nozzle 88 and the other side of the barrier. As a result, fire suppressant may be supplied behind the barrier (e.g., into a container 22) via penetrator assembly 54. (See FIG. 7B.) According to some embodiments, puncture actuator 90, rather than being a pneumatic or hydraulic actuator, may be an electrically-driven and/or spring-loaded actuator.

Exemplary deployment structure 52 also includes a number of actuators configured to control and drive movement of arm 76 relative to frame 58, so that penetrator assembly 54 can be positioned to facilitate delivery of fire suppressant to an appropriate container 22. For example, deployment structure 52 includes a stow actuator 72 mounted to stow mount 70 (see FIGS. 5 and 6). In particular, stow actuator 72, when actuated, either manually or via control system 32, retracts from a catch on, for example, cylinder portion 100 of puncture actuator 90, so that deployment structure 52 is released from its stowed condition (see FIG. 5) to a condition for being deployed (see FIG. 6). Upon release of stow actuator 72, arm 76 of deployment structure drops below the horizontal level of frame 58 and into an intermediate position (FIG. 6), so that arm 76 may be manipulated to move penetrator assembly 54 to be positioned to pierce a container 22 for receipt of receive fire suppressant.

In order to move penetrator assembly 54 to the desired position, deployment structure 52 further includes a swing lock actuator (not shown) and a swing actuator (not shown) including, for example, a linear actuator configured to pivot penetrator assembly 54. The swing lock actuator is configured to prevent a swinging or pivoting motion of arm 76 about hinge 68, so that penetrator assembly 54 does not move within first plane $P_1$ (e.g., a horizontal plane) (see FIG. 8A) relative to the stowed position of deployment structure 52. More specifically, in the stowed position (see FIG. 5), arm 76 is positioned next to brace member 60*b*. Thus, the swing lock actuator prevents arm 76 from moving in plane $P_1$, so that when arm 76 is deployed, it moves only in plane $P_2$ (e.g., a vertical plane) (see FIG. 8B). Thus, in the exemplary embodiment shown, penetrator assembly 54 moves only vertically, so that a container 22 below brace member 60*b* is pierced upon activation of penetrator assembly 54.

The swing actuator is configured to drive arm 76, so that penetrator assembly 54 moves in first plane $P_1$ when the swing lock actuator is disengaged to permit such movement. The swing actuator is mounted on frame 58 adjacent hinge 68 with its piston coupled to arm 76, such that upon extension of the piston of the swing actuator, arm 76 pivots on hinge 68, so that penetrator assembly 54 moves in plane $P_1$. As a result, rather than tip 98 of nozzle 88 piercing a container 22 located under brace member 60*b*, tip 98 pierces a container 22 located underneath brace 60*a*. Thus, by virtue of the ability of exemplary deployment structure 52 to swing penetrator assembly 54 from a position above a first one of containers 22 to a position above a second one of containers 22, a single one of exemplary fire suppressant devices 40 is able to selectively discharge fire suppressant into more than one container 22.

Deployment structure 52 is configured such that when tip 98 of nozzle 88 drops via gravity and presses against the upper wall of container 22 and resistance is provided against the force created by puncture actuator 90 when piston portion 102 of puncture actuator 90 is extended to pierce the upper wall of container 22. For example, a ratcheting catch (not shown) associated with deployment structure 52 adjacent hinge 80 holds arm 76 in a stable condition so that when tip 98 presses against the upper wall of container 22, the upper wall is punctured.

Figure 9A:
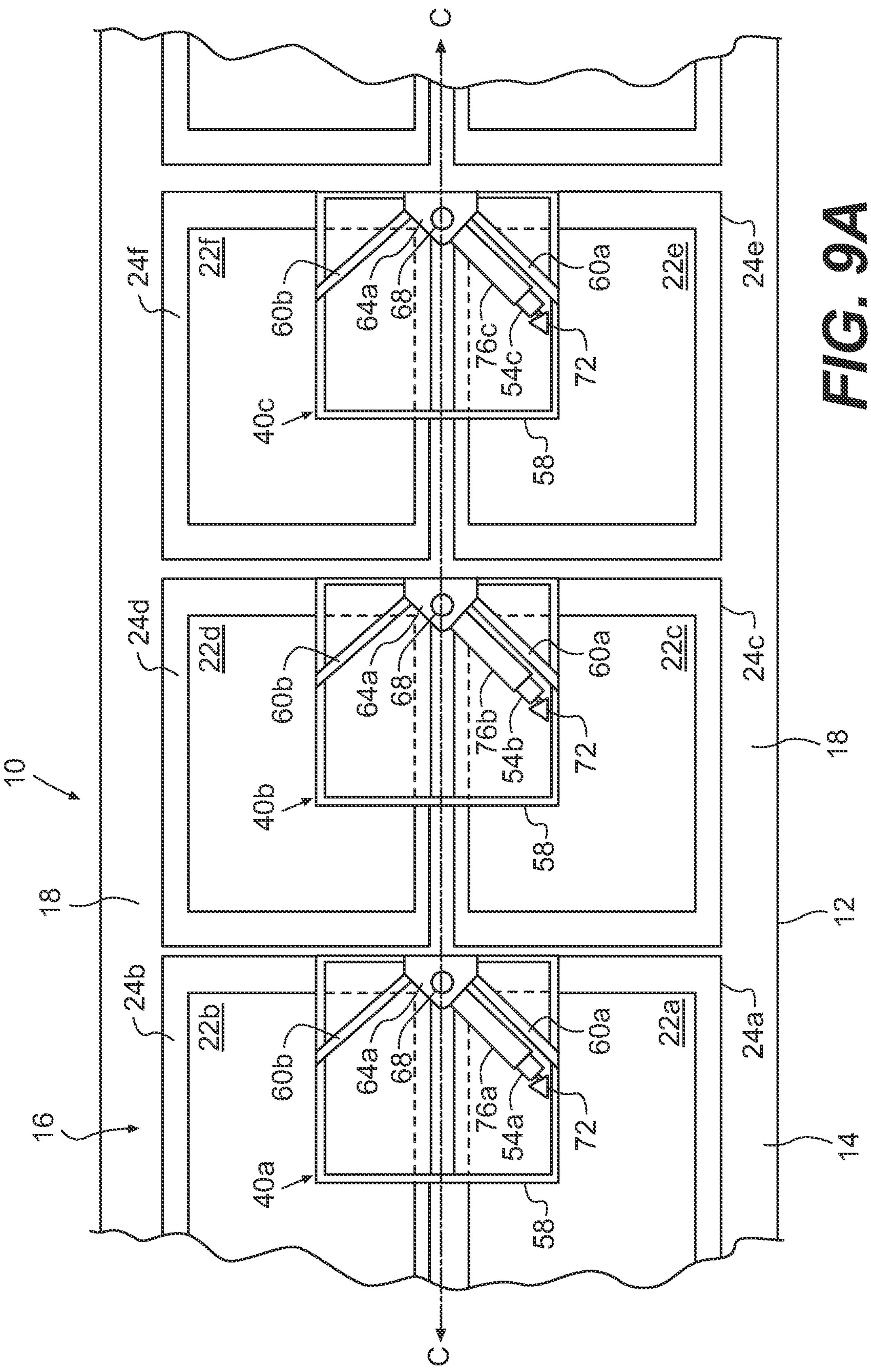
FIG. 9A is a schematic plan view of exemplary devices for suppressing fire arranged in an exemplary manner in an exemplary vehicle, with the devices shown in a first exemplary configuration.
Figure 9B:
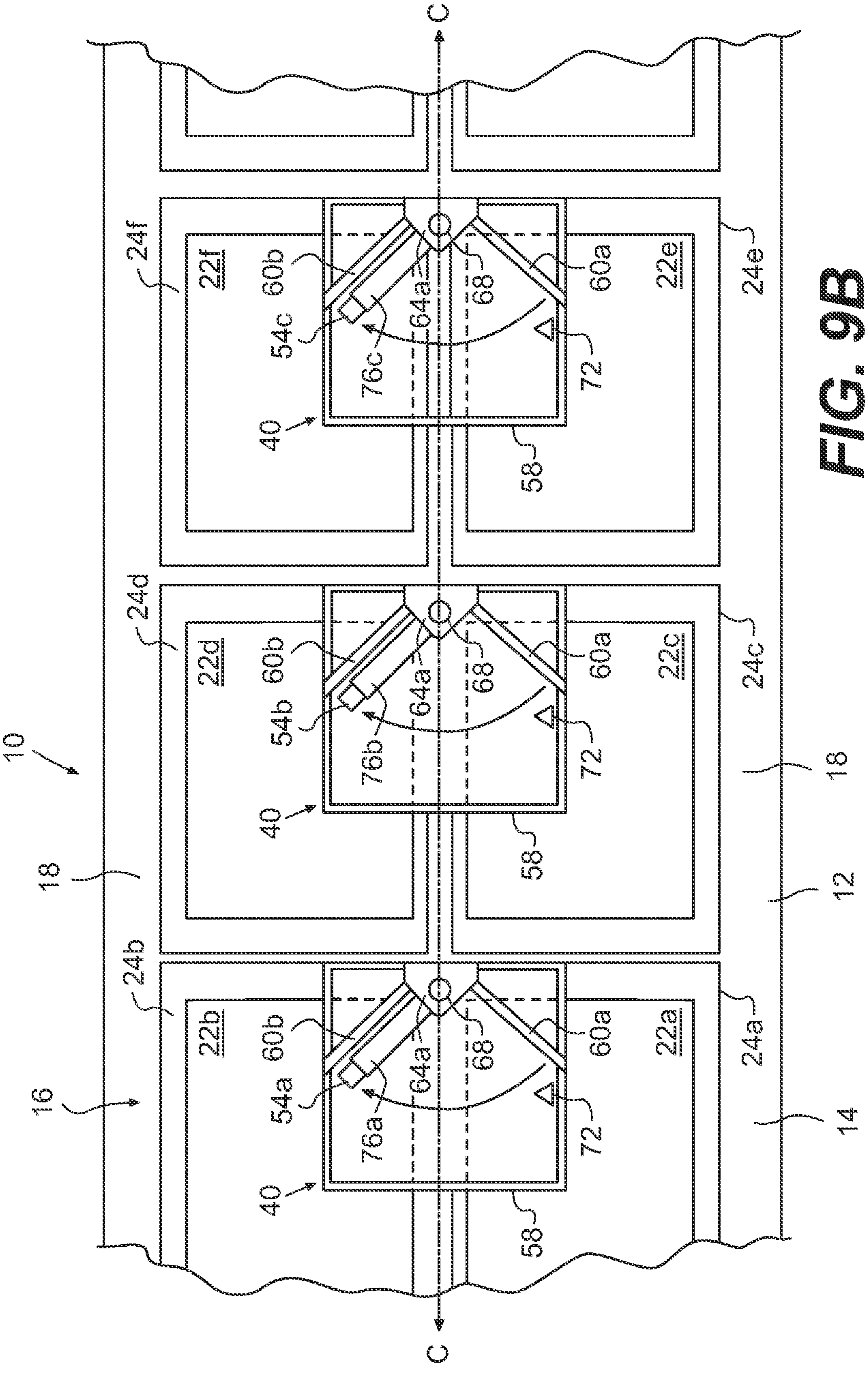
FIG. 9B is a schematic plan view of the exemplary devices shown in FIG. 9A, shown in a second exemplary configuration.

According to the exemplary embodiment of system 30 shown in FIGS. 9A and 9B, a single device 40 is able to supply fire suppressant into two different containers 22. In particular, as shown in FIG. 9A exemplary devices 40*a*, 40*b*, and 40*c* are mounted above respective pairs of cargo positions 24*a* and 24*b*, 24*c* and 24*d*, and 24*e* and 24*f*, at which respective pairs of containers 22*a* and 22*b*, 22*c* and 22*d*, and 22*e* and 22*f* are positioned. Arms 76*a*, 76*b*, and 76*c* of respective devices 40*a*, 40*b*, and 40*c* are able to swing in first plane $P_1$ from a position (see FIG. 8A), such that respective penetrator assemblies 54*a*, 54*b*, and 54*c* are positioned over containers 22*a*, 22*c*, and 22*e* (see FIG. 9A) to a position, such that respective penetrator assemblies 54*a*, 54*b*, and 54*c* are positioned over containers 22*b*, 22*d*, and 22*f* (see FIG. 9B). Exemplary control system 32 is able to either activate penetrator assemblies 54 to pierce containers 22 located under the penetrator assembly 54 in the stowed condition (FIG. 9A) or activate penetrator assemblies 54 to pierce containers 22 on the opposite side of the center line C of exemplary aircraft 10 (FIG. 9B). By virtue of a single device 40 being able to supply fire suppressant to more than one container 22, the number of devices 40 required to supply fire suppressant to all of the containers 22 in the cargo area 16 may be reduced, thereby reducing the weight of the overall system 30. According to some embodiments (not shown), device 40 may be configured to penetrate more than two containers 22, such as, for example, four containers, by modifying frame 58 to permit arm 76 to swing through a greater range on angles, such as about 270 degrees.

Figure 10A:
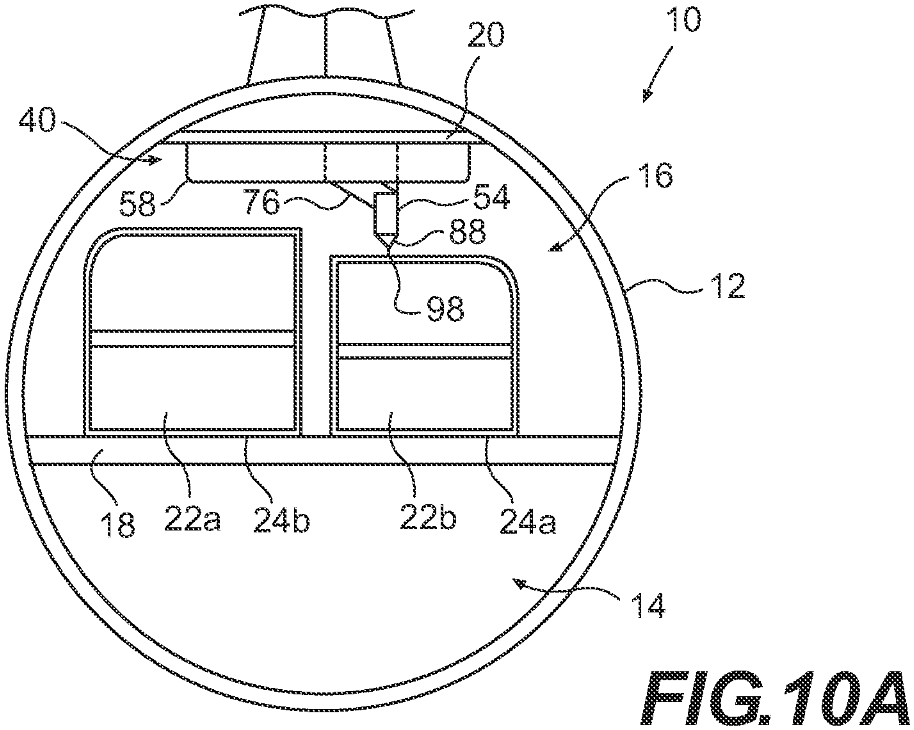
FIG. 10A is a schematic section view of an exemplary device for suppressing fire arranged in an exemplary manner during a first exemplary deployed operation.
Figure 10B:
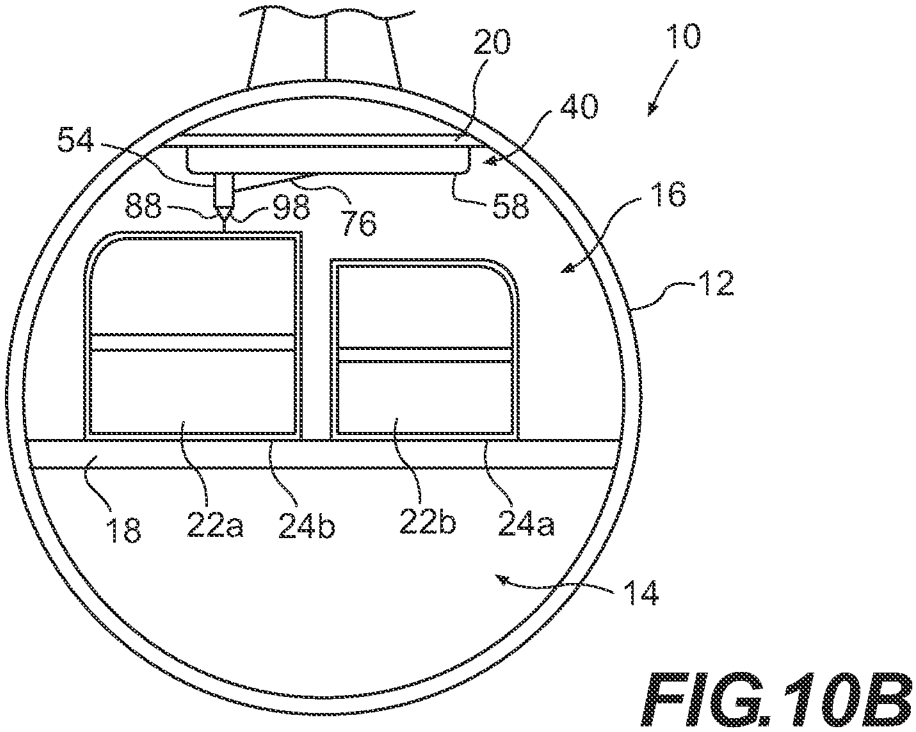
FIG. 10B is a schematic section view of the exemplary device shown in FIG. 10A, shown in a second exemplary deployed operation.

Referring to FIGS. 10A and 10B, exemplary system 30 is able to deliver fire suppressant to containers 22 having different heights. As shown in FIG. 10A, containers 22*a* and 22*b* are positioned at respective cargo positions 24*a* and 24*b*. If there is a fire associated with container 22*a*, device 40 is able to lower arm 76 through second plane $P_2$ (FIG. 8B) to a point at which tip 98 of nozzle 88 is just above or in contact with the upper surface of container 22*a*. Alternatively, if there is a fire associated with container 22*b*, device 40 is able to swing arm 76 through first plane $P_1$ to a point at which tip 98 of nozzle 88 is just above or in contact with the upper surface of container 22*b*, for example, as shown in FIG. 10B. Thus, the operation of some embodiments of system 30 is flexible enough to provide fire suppressant to containers of different heights.

According to some embodiments, nozzle 88 may be frangible, so that once the tip 98 has penetrated the upper surface of a container 22 and fire suppressant has been discharged into container 22, tip 98 of nozzle 88 may be disassociated from a portion of nozzle 88 and/or housing 84. Alternatively, or in addition, nozzle 88 may be easily removable from housing 84 via a quick-disconnect coupling, such as, quick-access fasteners and latches. This may be desirable because it facilitates ease of removal of the container 22 from cargo area 16 without disassembly or retraction of the device 40, thereby reducing inconvenience and time for removal of cargo from aircraft 10.

For the purpose of describing exemplary operation, operation of the exemplary embodiment of system 30 has been described in relation to exemplary aircraft 10. However, exemplary system 30 may be used in association with different vehicles and/or storage areas, with the operation tailored to those environments.

Figure 11:
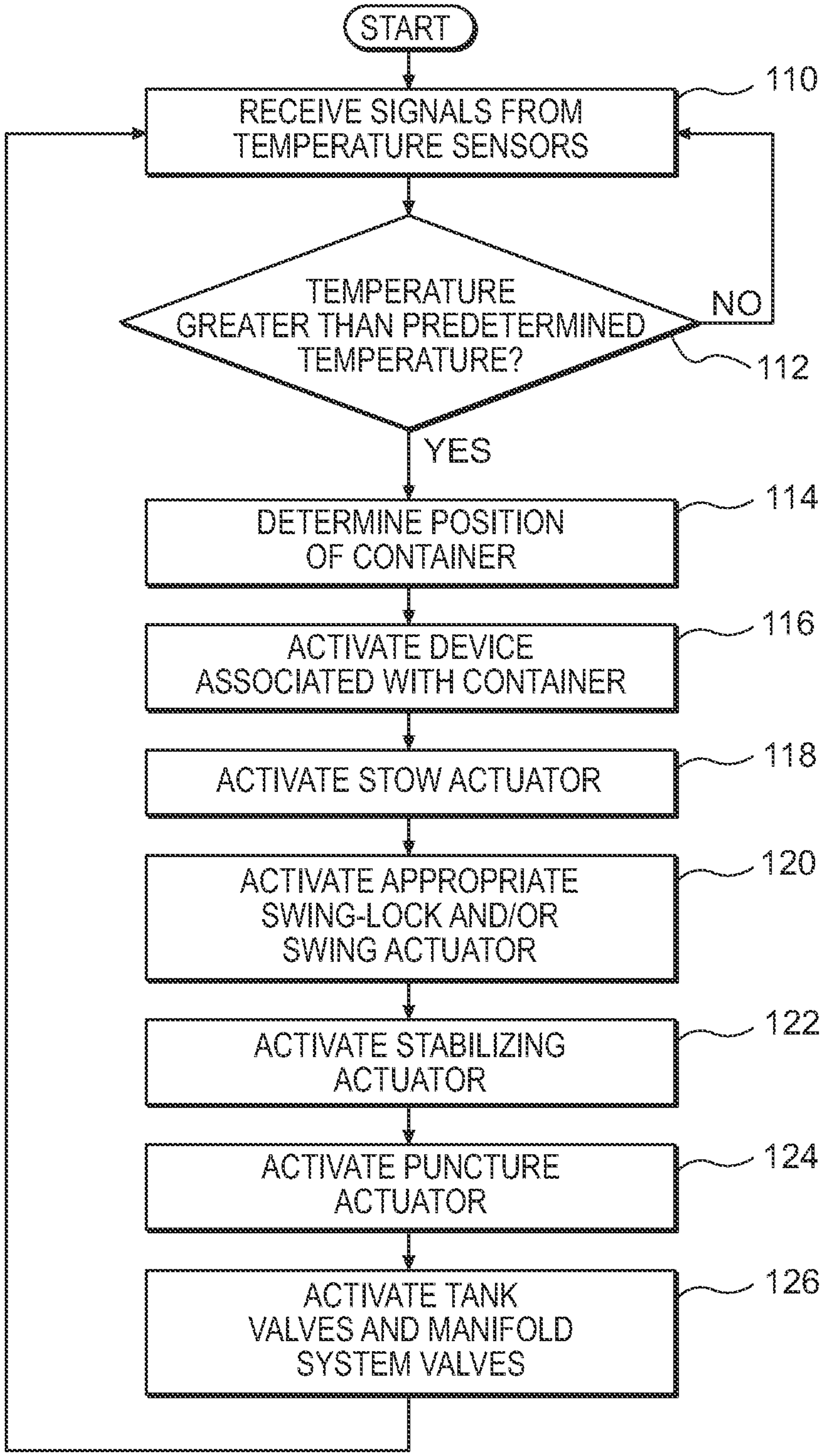
FIG. 11 is a block diagram showing exemplary control steps for controlling an exemplary fire suppressant system.

During operation of exemplary system 30, sensors 38 detect the temperatures associated with containers 22 (FIG. 4). For example, referring to FIG. 11, which provides a block diagram of exemplary control steps of exemplary control module 36, at step 110, control module 36 receives signals from the temperature sensors 38 indicative of the temperatures associated with respective containers 22. At step 112, control module 36 compares the indicated temperatures with a predetermined temperature. According to some embodiments, the predetermined temperature may differ for different containers 22, and/or the predetermined temperature may be dynamic. For example, the predetermined temperature may change with changing parameters, such as, for example, the ambient temperature outside aircraft 10 and/or the operation of aircraft 10 (e.g., whether aircraft 10 is flying, taxiing, or being loaded or unloaded).

At step 112, if no temperatures are greater than the predetermined temperature, control module 36 continues receiving and comparing temperatures, unless the system 30 is deactivated. However, if at step 112, a temperature associated with one of containers 22 is greater than the predetermined temperature, at step 114, control module 36 determines the cargo position 24 of the container 22 with which the high temperature is associated. At step 116, control module 36 activates the fire suppressant device 40 corresponding to the sensor 38 with which the high temperature is associated. For example, at step 118, control module 36 activates stow actuator 72, so that deployment structure 52 drops to an intermediate level. At step 120, control module 36 activates appropriate ones of the swing lock actuator and the swing actuator to deploy the penetrator assembly 54 to a position for piercing the appropriate container 22. At step 122, control module 36 activates a stabilizing actuator or mechanism (e.g., a ratcheting catch passively locks arm 76 into a stabilized position), so that tip 98 of nozzle 88 is positioned above or in contact with the upper surface of the container 22. At step 124, control module 36 activates puncture actuator 90, such that the upper surface of container 22 is pierced via tip 98 to provide flow communication between nozzle 88 and the interior of the container 22.

At step 126, after delaying a sufficient amount time for the nozzle 88 of penetrator assembly 54 of the appropriate fire suppressant device 40 to pierce the upper wall of the container 22, control module 36 activates appropriate valves associated with tanks 44*a*-44*c* and manifold system 46, so that gas and foam solution is supplied to the corresponding fire suppressant device 40. As a result, gas and foam solution are supplied to receiving chamber 86 of penetrator assembly 54, wherein the foam generator combines the gas and foam solution, and fire suppressant foam is generated, flows through chamber 94 of housing 84, into tubular member 96 of nozzle 88, and into the container 22 (FIG. 7B).

It is intended that this specification and the examples disclosed therein be considered as exemplary only, with a true scope and spirit of the invention being indicated by the following claims.

What is claimed is:

1. A system for suppressing fire, the system comprising:
- a support structure configured to be mounted inside a vehicle for transporting a plurality of containers;
- a pivot mount fixedly attached to and extending in a first direction from the support structure;
- a pivot member connected to the pivot mount via a first hinge, the pivot member being rotatable about a first axis transverse to the first direction;
- an arm coupled to the pivot member via a second hinge, the arm being rotatable about a second axis transverse to the first axis, the arm being movable to a plurality of predefined positions, each of the predefined positions disposed above a location configured to receive one of the plurality of the containers; and
- a penetrator assembly coupled to the arm and configured to pierce a container being transported by the vehicle and deliver a fire suppressant in the container.

2. The system of claim 1, wherein the penetrator assembly comprises:
- a nozzle having a tip configured to pierce the container; and
- an actuator configured to extend the tip of the nozzle such that the tip pierces the container.

3. The system of claim 2, wherein the penetrator assembly further includes:

at least one conduit configured to supply the fire suppressant to the nozzle.

4. The system of claim 3, wherein the nozzle comprises a tubular member including the tip, wherein the tip is frangible.

5. The system of claim 1, wherein the support structure includes one or more frame members configured to be attached to an interior of the vehicle.

6. The system of claim 3, further including:

at least one tank configured to contain the fire suppressant; and the at least one conduit connecting the at least one tank with the nozzle.

7. The system of claim 6, wherein the at least one tank comprises:

a first tank configured to contain a first fire suppressant component; and a second tank configured to contain a second fire suppressant component.

8. The system of claim 7, wherein the at least one conduit comprises:

a first conduit connecting the first tank and the nozzle; and a second conduit connecting the second tank and the nozzle.

9. The system of claim 8, wherein the first fire suppressant component comprises a gas, the second fire suppressant component comprises a foam solution, and the penetrator assembly is configured to combine the gas and the foam solution to form the fire suppressant.

10. The system of claim 1, wherein the arm extends from a first end to a second end, the first end of the arm is coupled to the second hinge, and the penetrator assembly is coupled to the second end of the arm.

11. The system of claim 1, wherein at least two of the plurality of predefined positions are maintained using two brace members connected to the support structure and positioned above a location configured to receive one of the plurality of the containers.

12. The system of claim 11, wherein the second end of the arm and the penetrator assembly are configured to pivot with respect to one another.

13. The system of claim 1, wherein the support structure comprises a stow actuator configured to maintain the penetrator assembly in a stowed condition and release the penetrator assembly from the stowed condition for movement to a deployed condition.

14. The system of claim 1, wherein the arm comprises an upper link and a lower link, and the upper and lower links extend parallel with respect to one another between a first end and a second end of the arm.

15. The system of claim 1, further comprising a controller configured to deploy the penetrator assembly upon detecting a temperature associated with a container that is greater than a predetermined temperature.

16. The system of claim 15, further including at least one sensor configured to detect the temperature associated with the container.

17. The system of claim 16, wherein the at least one sensor is one of a thermopile, an optical pyrometer, or an infrared sensor.

18. The system of claim 15, wherein the controller is further configured to activate a warning signal, wherein the warning signal comprises one of a warning light or an audible message.

19. The system of claim 11, wherein the pivot mount is fixedly attached to a base side of the support structure, and each of the two brace members extends from the base side to a differing side of the support structure.

20. The system of claim 1, further comprising a switch configured to deploy the penetrator assembly.

21. The system of claim 1, wherein the penetrator assembly is configured to move from a first position above a first one of the plurality of the containers to a second position above a second one of the plurality of the containers and to selectively discharge fire suppressant to more than one container.

22. The system of claim 11, wherein the two brace members are coupled to the pivot mount.

23. The system of claim 1, wherein the support structure is configured to transport containers having different heights.

* * * * *